United States Patent [19]
Williams

[11] Patent Number: 5,193,871
[45] Date of Patent: Mar. 16, 1993

[54] LAWN-CARE DEVICE FOR EXTRACTING WEEDS AND REMOVING DEBRIS

[76] Inventor: Donald E. Williams, 114 Palmer Pl., Washington, N.C. 27889

[21] Appl. No.: 878,332

[22] Filed: May 4, 1992

[51] Int. Cl.$^5$ .......................... A01B 1/16; A01D 9/06
[52] U.S. Cl. ........................................ 294/61; 294/50
[58] Field of Search ............... 294/19.1, 50, 50.5–50.7, 294/61, 120, 126; 30/129; 111/92, 99, 101, 106, 115; 172/21, 22, 25, 371, 378, 379

[56] References Cited

U.S. PATENT DOCUMENTS

| | | | |
|---|---|---|---|
| 1,225,188 | 5/1917 | Smith | 294/50.7 |
| 1,466,168 | 8/1923 | Holton | 294/50.5 |
| 1,965,177 | 7/1934 | Finkl | 172/21 |
| 1,993,314 | 3/1935 | Belford | 294/61 |
| 2,030,770 | 2/1936 | Smith | 294/50.7 X |
| 2,500,647 | 3/1950 | Schulthess | 294/61 |
| 2,695,188 | 11/1954 | Klausman et al. | 294/61 |
| 2,747,528 | 5/1956 | Hunkins | 111/92 |
| 2,804,336 | 8/1957 | Thompson | 294/61 |
| 3,444,934 | 5/1969 | Alberto | 172/25 |
| 3,596,966 | 8/1971 | Shredl | 294/61 |
| 3,602,542 | 8/1971 | Disston | 294/50.7 |
| 3,633,958 | 1/1972 | Mesrobian | 294/61 |
| 3,663,050 | 5/1972 | Fuchs | 294/50 |
| 4,081,192 | 3/1978 | Jones | 294/61 |
| 4,791,995 | 12/1988 | Hochlan | 294/61 X |
| 5,004,283 | 4/1991 | Sullivan | 294/61 |
| 5,005,888 | 4/1991 | Parks | 294/50 |

Primary Examiner—Johnny D. Cherry
Attorney, Agent, or Firm—Olive & Olive

[57] ABSTRACT

A device for removing plants with roots from the soil having spikes attached at the lower end of a shaft and a trigger mechanism located at the upper end. The spikes are shielded by a cover having holes alignable with the spikes. A rod extending down the interior of the shaft is attached to both the cover and the trigger mechanism. When the trigger mechanism is pulled, the rod and cover are pulled upward which exposes the spikes. When the trigger mechanism is released, a spring mechanism pushes the cover over the spikes.

5 Claims, 2 Drawing Sheets

LAWN-CARE DEVICE FOR EXTRACTING WEEDS AND REMOVING DEBRIS

BACKGROUND OF THE INVENTION

1. Field of the Invention

This invention relates to hand-held devices used for removing weeds from the ground and to devices for picking up debris.

2. Description of the Related Art

Numerous devices for removing weeds from the ground have been developed. Many of these devices have sharp or pointed lower edges, hooks, or one or more tines or spikes which are used to stab the earth adjacent to the roots of the plant that is to be removed from the earth.

A variety of tine structures, orientations and methods of attachment to handles have been devised to assist in separating the weed roots from the surrounding soil.

For example, the patent of Shredl (U.S. Pat. No. 3,596,966) is for a weeder which has a plurality of prongs projecting from one end of the handle. The prongs engage the weed and break up the ground surrounding the weed as the handle is rotated. The weed becomes entangled in the prongs and may be removed from the soil.

The device of Disston, Jr. (U.S. Pat. No. 3,602,542) is a weeder having a handgrip on one end, four slanted tines on the other end affixed to the underside of a plate, and a stripper member located beneath the plate to eject the removed weed from the tines. The stripper member has an upwardly extending actuator so that it may be moved from a position adjacent the plate to the end of the tines, thus clearing the tines of affixed plant material.

The weed removing tool of Fuchs (U.S. Pat. No. 3,663,050) includes a large sleeve having prongs extending therefrom for engaging the plant. The prongs extend from a fixed block in the central opening of the sleeve. The large sleeve is slidably attached to an inner sleeve by means of a nut and bolt fastener extending through the inner sleeve and slots in the large sleeve. An external coil spring extends from the fastener to the end of the lower sleeve. The large sleeve may be pushed down against the spring to push a plant from the tines.

The patent of Sullivan (U.S. Pat. No. 5,004,283) is for a rotary weed extractor. Spikes are mounted on a block on the lower end of a torque bar. A spring-loaded ejector cartridge is movably mounted on the torque bar and includes a plate mounted between the spikes. A weed removed with the extractor is expelled by manually extending the ejector cartridge along the torque bar.

The garden tool of Parks et al. (U.S. Pat. No. 5,005,888) has a prong assembly connected to a housing. The prong assembly and a handle assembly are snappingly connectable to the housing, and means are included for preventing rotation relative to the housing when the device is rotated to remove a weed.

Tines or spikes are also provided on a variety of hand-held devices used to pick up trash and other debris. For example, in the patent of Jones (U.S. Pat. No. 4,081,192), spikes are mounted in a line on a block, and a stripper plate with holes is manually pushed over the spikes to remove speared trash.

Hand-held weed removal devices requiring rotation to remove the weeds often fail to pull the plant out of the earth when the tines are removed from the soil. When the plant is removed from the soil, many devices do not have a convenient way to remove the speared plant from the tines. Rotation of weed-removing devices in the soil, especially firm, heavy or root-containing soil, is often difficult, especially for persons who are not especially strong.

Most devices which are useful in weeding are not particularly useful in picking up pine cones, branches or other debris which may also be present on a lawn requiring weed removal. Also, many of the devices used for weeding or for picking up debris that have exposed tines, spikes, prongs or other sharp points present a potential source of injury.

It is therefore an object of this invention to provide a lawn-care device which is useful both for extracting weeds from the soil and for picking up debris.

It is another object of this invention to provide a lawn-care device having spikes and a protective cover for the spikes.

It is a further object of this invention to provide a lawn-care device which is easily inserted into the soil around a plant to be removed, and which may be used to remove plants from the soil without requiring rotation of the device.

It is another object of this invention to provide a lawn-care device having an easily operated means of removal of the plant from spikes of the device.

Other objects and advantages will be more fully apparent from the following disclosure and appended claims.

SUMMARY OF THE INVENTION

The invention is a device for removing plants with roots from the soil. Spikes are attached at the lower end of a shaft and a trigger mechanism is located at the upper end. The spikes are shielded by a cover having holes alignable with the spikes. A rod extending down the interior of the shaft is attached to both the cover and the trigger mechanism. When the trigger mechanism is actuated by pulling on a cross-piece, the attached rod and cover are pulled upward which exposes the spikes. When the trigger mechanism is released, a spring mechanism pushes the cover over the spikes.

Other aspects and features of the invention will be more fully apparent from the following disclosure and appended claims.

DETAILED DESCRIPTION OF THE INVENTION AND PREFERRED EMBODIMENTS THEREOF

The present invention is a device 20 for extracting weeds from the earth and for picking up debris such as pine cones. The device in its most basic concept comprises a shaft 22, a plurality of shieldable spikes 24 at a distal end of the device 20, and a trigger mechanism 26 at the proximal end of the shaft 22 which may be actuated to expose the spikes 24 from a shielded position (FIGS. 1-4).

As used herein to describe the invention, the word "spike" or "spikes" refers to pointed projections, which may also be termed tines or prongs. When used in reference to the shaft and components attached thereto or positioned with respect to the shaft, the terms "proximal" and "distal" refer respectively to locations on the device near to, and distant from, the uppermost end of the shaft during use.

The shaft 22 is preferably a hollow metal or PVC pipe which is about 31-32 inches long and about 1 inch wide. In use, the upper, proximal end of the shaft 22 is grasped by a person using the device 20, and the spikes 24 at the distal end of the device 20 are inserted into the soil.

Figure 4:
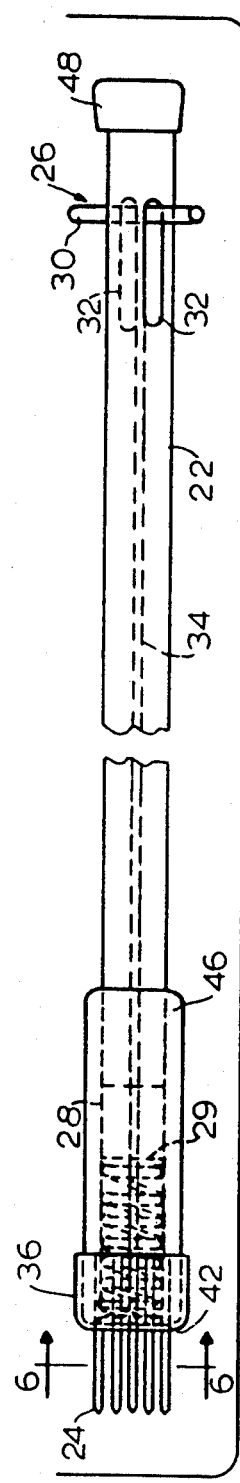
FIG. 4 is an elevational side view of the device of the invention with the spikes exposed.

A plurality of spikes 24 is attached to the device 20 near its distal end (FIG. 4). Preferably, there are at least three, and most preferably five, spikes 24 arranged circumferentially around a distal end of either the shaft 22 or a spike attachment piece 28 (see below). Use of five spikes 24, each of which has a diameter of about 3/32 inch and is about 2-¼ inches long, provides an optimal balance between ease of piercing the soil, strength, and ease of removal of attached plants.

Most preferably, the device 20 comprises a separate spike attachment piece 28 which is partially inserted into the distal end of the hollow main shaft 22 and extends coaxially with the shaft 22. Preferably, a pin 29, with a diameter of about ⅛ inch extends across the interior of spike attachment piece 28 and through holes 31 (shown in FIG. 2) in both the attachment piece 28 and the shaft 22. The ends of pin 29 are preferably about even with the exterior of shaft 22. Alternatively, any mechanism to hold the two pieces firmly together may be used. Thus, although in the broadest aspect of the invention the main shaft 22 may extend from the proximal end of the device to a point where the spikes 24 are attached, the shaft 22 most preferably extends to a point adjacent to, but proximal from, the position of attachment of spikes 24 to the separate spike attachment piece 28 (FIG. 3). It is an advantage to have multiple tubular layers at the distal end of the device 20 to provide strength for insertion of the device 20 into the ground and removal from the ground.

Near the proximal end of the shaft 22 is located a trigger mechanism 26 for use in exposing the spikes 24 of the device 20 FIGS. 1-4) The trigger mechanism 26 preferably comprises a cross-piece 30, and two slots 32 extending parallel to the axis of the device 20 on opposite sides of the shaft 22. The central area of the cross-piece 30 is attached to the proximal end of a rod 34 which extends down the hollow center of the shaft 22 from the cross-piece 30 to the distal end of the device 20. The rod 34 is discussed in more detail below.

The cross-piece 30 is longer than the width of the shaft 22, preferably about 2 inches long, and is positioned perpendicular to the axis of the device 20 with the ends of the cross-piece 30 extending through the slots 32. When the cross-piece 30 of the trigger mechanism 26 is not in the upward, pulled position, the cross-piece 30 rests at the distal end of the slots 32 (FIG. 3). When the cross-piece 30 of the trigger mechanism 26 is pulled proximally by fingers placed on the distal sides of the ends of the cross-piece 30, the cross-piece 30 moves proximally in the slots 32 (FIG. 4).

The rod 34 is preferably made of steel or any other strong material capable of withstanding pull against the force of a spring (see below). The rod 34 is long enough to extend between the cross-piece 30 and the cover 36 and is about 1/16 inch in diameter.

The cover 36 is located at the distal end of the device 20 (FIGS. 1-4) and covers the ends of the spikes 24 when the cross-piece 30 of the trigger mechanism 26 is not pulled toward the proximal end of the device 20 (FIG. 3). The distal end of rod 34 which extends from near the proximal end of the shaft 22 at the trigger mechanism 26 (see above) is attached at a rod-attachment site 38 within the cover 36 and at the distal end of the cover 36.

Figure 6:
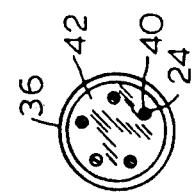
FIG. 6 is a cross-sectional view of the device taken at 6—6 in FIG. 4 showing the preferred spike arrangement.
Figure 5:
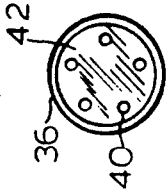
FIG. 5 is an elevational view of the distal end of the device of the invention.

The cover 36 has holes 40 in its distal surface 42 (FIGS. 5-6) which are held in alignment with the spikes 24 by the attached rod 34, so that when the cover 36 and rod 34 are pulled proximally by the cross-piece 30 of the trigger mechanism 26 at the other end of the rod 34, the spikes 24 are exposed as the holes 40 in the cover 36 move proximally over the spikes 24.

Figure 1:
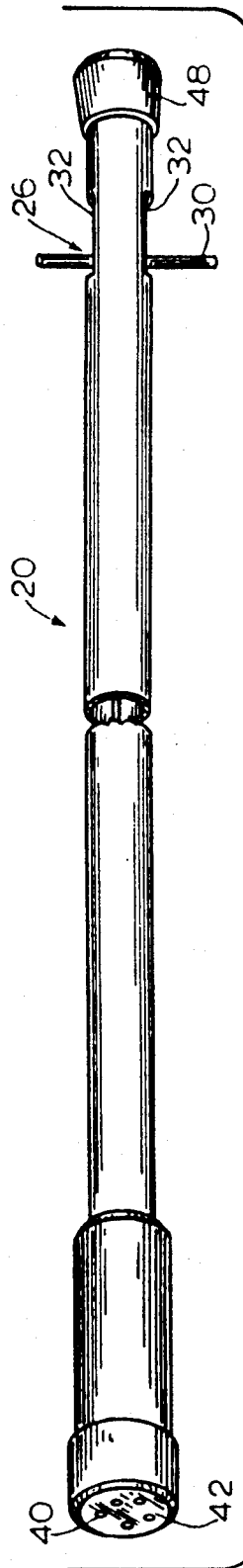
FIG. 1 is a perspective view of the device of the invention.
Figure 2:
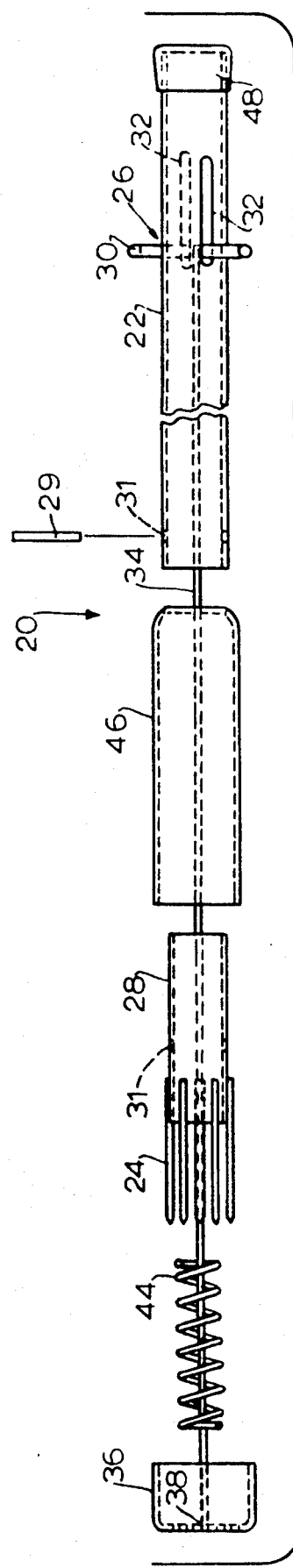
FIG. 2 is an exploded view of the components of the preferred embodiment of the device of the invention.
Figure 3:
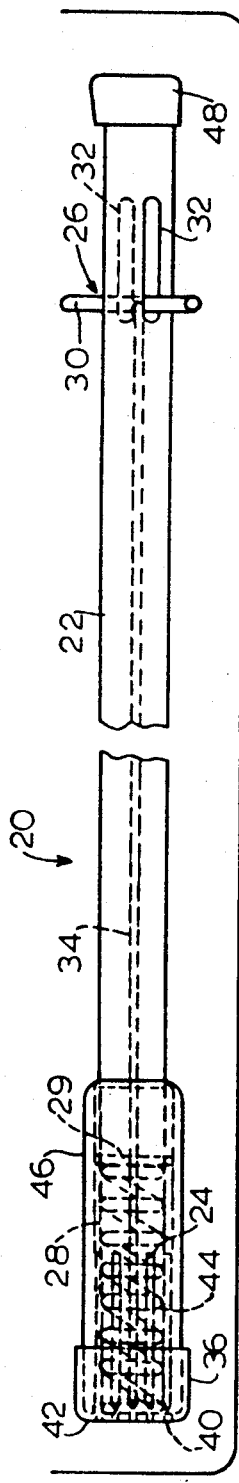
FIG. 3 is an elevational side view of the device of the invention with the spikes covered.

A spring 44 surrounds the rod 34 at the distal end of the device 20 and has its distal end within the cover 36 (FIG. 2). A preferred spring 44 is about 2-½ inches long and about ¾ inch in diameter. In the resting position when the cross-piece 30 of the trigger mechanism 26 is not pulled proximally, the distal end of spring 44 rests against the inside of the cover 36 and against pin 29 within the spike attachment piece 28, thus holding the cover 36 at its most distal position when the cross-piece 30 of the trigger mechanism 26 is not pulled proximally (FIG. 3). When the cross-piece 30 is pulled proximally, the cover 36 is pulled proximally by the rod 34 attached to both the cross-piece 30 and the cover 36, compressing the spring 44 within the circle of spikes 24 against pin 29 in the spike attachment piece 28 (FIG. 4). When the cross-piece 30 of the trigger mechanism 26 is again released the cover 36 is pushed distally by the expanding spring 44.

A hollow sleeve piece 46 is preferably attached to the cover 36, or alternatively, a one-piece cover 36 with a long sleeve component (not shown) extending over the entirety of the spikes 24 may be provided. If a separate sleeve-piece 46 is provided, the outer diameter of the sleeve-piece 46 is preferably small enough so that the distal end of the sleeve-piece 46 fits within the cover 36. The combined cover 36 and sleeve-piece 46 extend over the distal end of the spike attachment piece 28 and spikes 24 when the cross-piece 30 is not pulled toward the proximal end of the device 20. When the cross-piece 30 is pulled proximally, the cover 36 and inserted sleeve-piece 46 are pulled together.

At the proximal end of the shaft 22, a cap 48 is preferably placed as is known in the art of hand implements to protect the hand of the user from the end surface of the shaft 22, and to provide a smooth feel and appearance (FIGS. 1-4). This allows the user of the device of the invention to place the proximal end of the device in the palm of a hand, so that fingers of that hand may be easily aligned o either side of the shaft 22 to pull the cross-piece 30 proximally in the slots 32. The cap 48 may be made of plastic, rubber or other sturdy material as is known in the art.

The device 20 may be used for removing plants from the ground or for picking up pine cones and other debris. To remove plants, the distal end of the device 20 is positioned over the selected plant. The cross-piece 30 of the trigger mechanism 26 is pulled to expose the spikes 24 and the spikes 24 are pushed into the ground around the plant. The device 20 is then tilted toward the user at an angle of about 12 degrees. The person removing the plant then exerts force against the distal portion of the device 20, for example, kicks the lower part of the device 20, at the position of the sleeve-piece 46, which knocks the spikes 24 and surrounded plant out of the ground. If the plant remains affixed to the spikes, the trigger may be released so that the spring 44 forces the cover 36 downward over the spikes 24.

To pick up pine cones or other debris, the spikes 24 are simply inserted in or into the object in the manner of other tined trash pick-up devices.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A device for removing plants with roots from the soil, said device having a distal end and a proximal end and comprising:
   (a) a shaft having a linear axis and a central bore;
   (b) a plurality of spikes attached near said distal end of said device and extending toward said distal end in parallel to said linear axis;
   (c) a trigger mechanism near said proximal end of said device;
   (d) a cover having holes alignable with said spikes, said cover having a distal inner surface;
   (e) a spring mechanism contiguous with said inner surface; and
   (f) an elongated rod extending axially in said central bore and attached at a first end to said trigger mechanism and at a second end to said cover;
   wherein when said trigger mechanism is actuated, said cover is pulled toward said proximal end, said spring mechanism is compressed, and said spikes are exposed, and when said trigger mechanism is released, said spring mechanism pushes against said inner surface and said cover moves distally over said spikes.

2. A device for removing plants with roots from the soil according to claim 1, wherein said shaft has a pair of slots on opposites sides near said proximal end, and wherein said trigger mechanism comprises a cross-piece attached to said rod and extending through the slots.

3. A device for removing plants with roots from the soil according to claim 1, further comprising a spike attachment piece having a hollow bore and being attached to a distal end of said shaft, wherein said spikes are attached to said spike attachment piece.

4. A device for removing plants with roots from the soil according to claim 3, wherein there are five spikes and said spikes are arranged circumferentially around the distal end of said spike attachment piece.

5. A method of removing plants with roots from the soil, comprising:
   (a) providing a device having a distal end and a proximal end and having:
      (i) a shaft having a linear axis and a central bore;
      (ii) a plurality of spikes attached near said distal end of said device and extending toward said distal end in parallel to said linear axis;
      (iii) a trigger mechanism near said proximal end of said device;
      (iv) a cover having holes alignable with said spikes, said cover having a distal inner surface;
      (v) a spring mechanism contiguous with said inner surface; and
      (vi) an elongated rod extending axially in said central bore and attached at a first end to said trigger mechanism and at a second end to said cover;
   (b) actuating said trigger mechanism to pull said cover toward said proximal end, compress said spring mechanism, and expose said spikes;
   (c) inserting said spikes into soil surrounding a selected plant to be removed from the soil;
   (d) tilting said shaft; and
   (e) exerting force against a distal portion of the device to remove said spikes from the soil.

* * * * *